M. LACHMAN.
VEHICLE WHEEL.
APPLICATION FILED JULY 7, 1916.
1,215,554.
Patented Feb. 13, 1917.
2 SHEETS—SHEET 1.
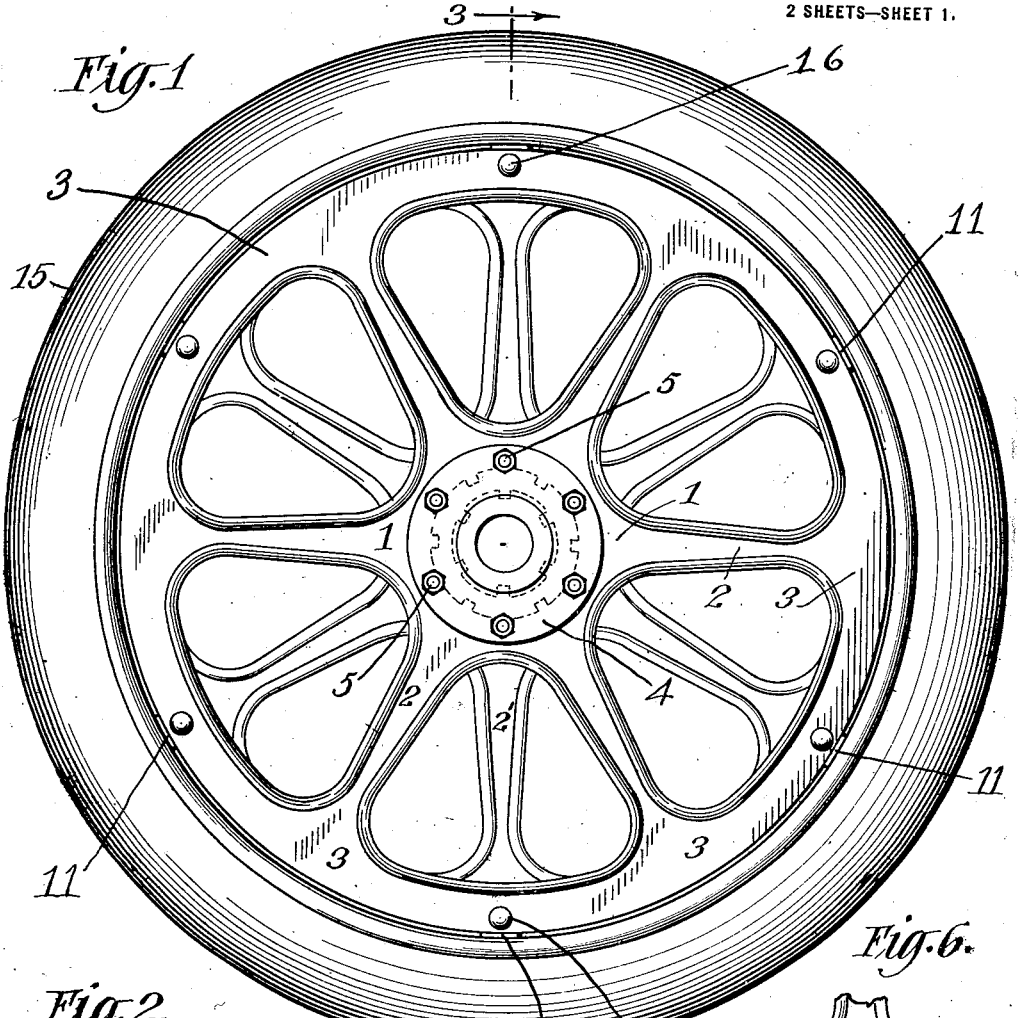
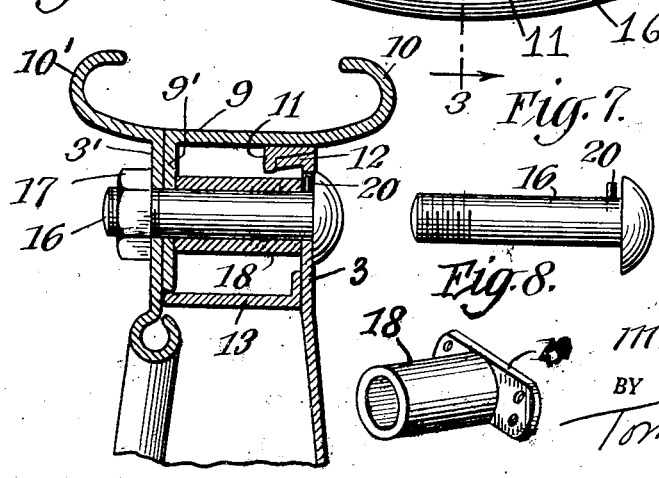
INVENTOR.
Maurice Lachman
BY
Townsend & Becker
ATTORNEYS.

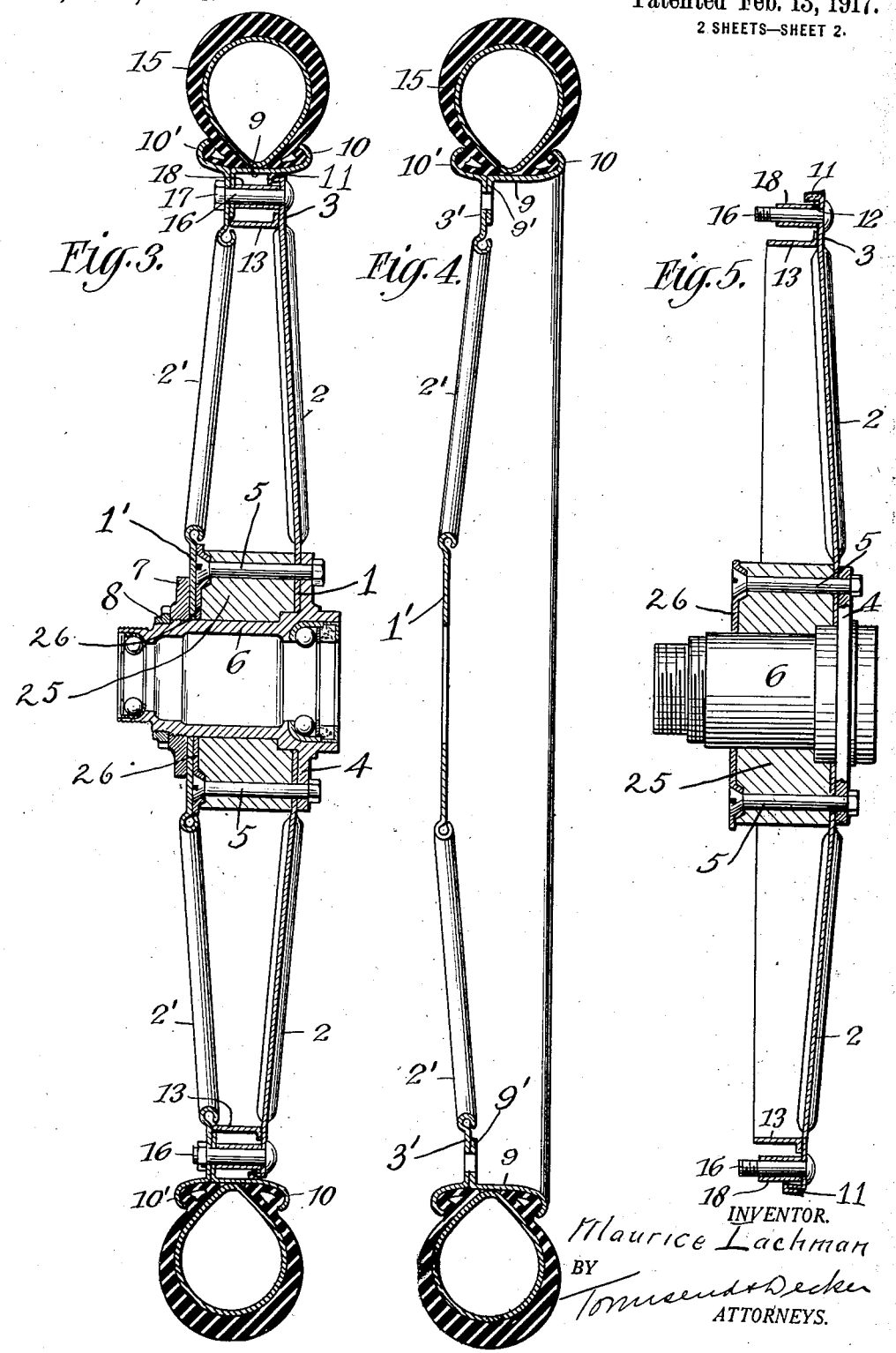

UNITED STATES PATENT OFFICE.

MAURICE LACHMAN, OF NEW YORK, N. Y., ASSIGNOR TO STRUCTURAL PRESSED STEEL WHEEL COMPANY, INC., OF NEW YORK, N. Y., A CORPORATION OF NEW YORK.

VEHICLE-WHEEL.

1,215,554.  Specification of Letters Patent.  Patented Feb. 13, 1917.

Application filed July 7, 1916. Serial No. 107,909.

*To all whom it may concern:*

Be it known that I, MAURICE LACHMAN, a citizen of the United States, and a resident of New York, in the county of New York and State of New York, have invented certain new and useful Improvements in Vehicle-Wheels, of which the following is a specification.

My invention relates to the construction of a wheel provided with a pneumatic tire.

The object of the invention is to provide a simple and efficient construction of wheel such that a damaged tire may be readily replaced by a new one fully inflated and without removal of the wheel hub from the axle.

My invention comprises a sectional wheel the sections or elements of which are separable in a plane transverse to the wheel's axis and are adapted to be detachably fastened together, the inner one of said sections comprising a center and a spoke or web portion permanently mounted on the body of the hub by its center and the outer section having a center and web or spoke portion on which is permanently mounted a felly part constituting a complete tire carrying rim, said outer section bearing removably against the said hub and said felly portion being in the form of an ordinary complete demountable rim affording in itself a complete support for the tire and having a separable bearing on the edge of the inner section whereby, on removing the outer section, the tire and its complete mounting are detached with the tire in place upon said section and may be replaced by a duplicate section having the tire mounted and inflated thereon.

It has heretofore been proposed to employ a demountable rim having an inflated shoe or tire attached thereto and itself detachably secured over or upon the rim of the complete wheel by wedge bolts or screws engaging some portion of said rim and having an engagement with the wheel body.

It has also been proposed to make the wheel in two parts each of which carries a portion of the rim so that on removing the outer part of the wheel the portions of the rim become separated and the shoe becomes bodily detached or free from the rim. It has also been proposed to make each part of the wheel engage a tire carrying rim to secure it to the wheel, in which case the rim is completely detached from both parts of the wheel when one part is removed from the hub.

In my improved construction I dispense with the use of a separate rim constituting the felly portion of the wheel and employ a rim which serves the double function of the ordinary demountable rim and of the wheel felly and so that, on detaching the section or outermost portion of the wheel from the hub, the rim or felly part of the wheel bearing the shoe with it is removed and may be replaced by a similar section bearing a shoe fully attached and inflated. The removable section of wheel in my invention embodies a web or spoke portion as does also the inner or permanently fastened section borne permanently by the hub and my invention resembles in part the ordinary detachable wheel in so far as the tire with wheel spokes and a hub part are removed together, but differs therefrom in that it is not necessary, when my invention is used, to remove the entire wheel with its permanent hub and all of the structure constituting the complete wheel. Hence, the task of replacing the shoe for service on the automobile is much less laborious than with ordinary detachable wheels while my construction possesses, among other advantages over ordinary demountable rim constructions, the advantage that it is of simple construction and of great strength as well as easy of operation in the work of substituting an inflated for a deflated tire. Also the added weight in carrying spare tires is considerably less than in the case of detachable wheels.

In carrying out my invention it is preferable to employ for the two sections of the wheel two stamped sheet metal disks, dished and having their concave sides opposed, each disk or stamping comprising a center by which it is secured to the hub, a web or spoke portion and a circumference or rim portion, the inner section or element being permanently secured to the hub while the outer section or element is detachably fastened thereto and is provided on its circumference with a permanently attached tire carrying rim answering to the felly of the wheel and adapted to support and lock the shoe or tire in place on said rim as well as to engage by its inner edge the circumference of the inner stamping. To detachably lock the two elements together suitable plain cross bolts are preferably provided near the circumference of the stampings and removable nuts upon said bolts permit the outer stamping or section with the rim and attached shoe to be removed and a new section with inflated tire fixed thereon to be substituted.

It is preferable also to employ a series of isolated wedging lugs arranged in the circumference of a circle whose axis coincides with the wheel axis and by which the rim engages the circumferential edge of the inner section or disk so as to properly center the outer section upon the structure when it is drawn up into place by the detachable fastening devices. These form practically the only bearings between the sections which are liable to become rusted together and hold the removable section of the wheel against removal, but as the surfaces of engagement are isolated or of small extent they will not interfere seriously with the detachment of the outer section bearing the shoe.

In the accompanying drawings I show my invention as carried out in a form in which the two elements or sections of the wheel consist of metal disks or stampings.

Figure 1 is a rear elevation of the complete wheel with the inflated tire mounted thereon.

Fig. 2 is a transverse cross-section through the outer portion of the wheel.

Fig. 3 is a transverse section through the complete wheel including the hub.

Fig. 4 shows in vertical transverse section and in detached relation the outer section and the inflated tire carrying rim with tire attached.

Fig. 5 is a similar view of the inner section in place on the axle after removal of the outer section and before the application of a new outer section carrying a new inflated tire.

Fig. 6 is a front elevation of the center of the wheel.

Fig. 7 shows in detached relation one of the locking bolts applied near the circumference.

Fig. 8 shows a support and housing adapted to support said bolt after removal of the bolt nut and front section of the wheel.

The inner section or part permanently incorporated or secured to the hub comprises the center 1, the web 2 and the continuous or uninterrupted circumference 3, all preferably consisting of a metal stamping or disk which may have openings cut in its web portion to give the appearance and effect of spokes. The metal edge of the openings is here shown as folded up into a strengthening bead or edge, but this forms no part of my present invention and is claimed separately in a separate application for patent filed June 12, 1916, S. N. 103,145 as well as in a divisional application of that application filed July 12, 1916, S. N. 108,875.

The center of the inner disk may be permanently fastened to the hub by bolts as indicated at 5, passing through said center and through the hub flange 4. 6 is a metal tube or shell constituting the hub center and carrying the usual races for the balls or other anti-friction devices and is provided at its outer end with the usual means for attachment of the hub cap and is also preferably threaded for the application of a clamp nut 7 and locking nut 8 whereby the outer section may be detachably clamped by its center to the wheel hub, as will be presently described. 25 indicates a filling or spacing block preferably of wood for spacing the wheel sections apart at the hub. The block 25 is provided with a wearing plate 26. The block 25 and plate 26 form part of the complete hub structure of which the tube 6 is the center.

The outer section is preferably similar as respects its center 1', web 2' and circumference 3' to the similar parts of the inner section but carries in addition and as a permanent attachment the complete tire carrying rim 9 shown here as a clencher type of rim adapted to secure an inflated tire by locking at both edges thereof. Said rim as to its outer flange 10' may form an integral extension of the circumference of the outer metal disk, the inner flange portion 10 being formed upon the opposite edge of the rim which, as to its body portion, is properly incorporated with or secured to the circumference of the outer disk, all to form a section and rim demountable together and carrying, when demounted and ready for replacing, an inflated tire. The formation of the outer section and complete rim as practically one structure may be attained by welding the flange 9' of the rim 9 to the inner side of the circumference 3'.

The spoke portions 2 of the inner disk are preferably staggered in relation to those of the outer disk.

11 indicates isolated seating lugs preferably provided for the rim 9 and disposed around the circumference of the inner section of the wheel and preferably secured to the circumference 3 thereof in any suitable manner, as for instance by welding. Preferably the outer edge of the inner section carrying said lugs is formed with a flange 12 as shown, to strengthen the same and said lugs are welded upon the periphery of said flange. Said lugs are formed preferably also to operate as wedging lugs or seats and are engaged by the rim, as shown, the latter being preferably slightly inclined on the surface where it engages said lugs so as to coöperate therewith in a wedging action which seats the rim firmly and centers the outer upon the inner section when the two parts are drawn together. The inner disk or section may also be provided, if desired, with a spacing and strengthening flange 13 electrically welded or otherwise suitably secured thereto and adapted to be engaged by the outer disk or section near the circumference. This flange serves to close the space between the two disks at their circumferences to prevent the accumulation of dirt, &c.

I have shown the rim as constructed for holding a clencher type of inflated tire 15 but, as will be obvious, the rim might be constructed for holding and carrying with it the usual straight-side type of tire, or be otherwise constructed for the same purpose.

For drawing the two sections together and holding them firmly in a detachable manner at their circumference, I preferably provide bolts 16 and nuts 17, said nuts being upon the outside and the bolts themselves being housed and supported partially in the sleeves or bushings 18 which are fastened by their flanges 19 over openings in the circumference of the inner disk. The bolts are provided with fins or pins 20 to prevent them from turning when the nuts 17 are turned, said bolts extending through openings in the circumference 3' of the outer disk. When the nuts are removed and the outer section with rim and tire secured thereto are detached, the bolts 6 are sustained in the tubes or sleeves 18 in proper position ready for the application of another section with rim and inflated tire thereon.

When it is desired to replace a defective shoe or tire by a new one ready inflated, the nuts 7 and 8 applied to the center of the outer section are removed as well as the nuts 17 which clamp the two sections together by their continuous circumferential portions 3, 3'. The outer section may then be slipped off the hub carrying the complete tire supporting rim and tire with it. A duplicate section having an inflated tire already locked upon the rim is then slipped into place, after which the application of and the tightening up of the nuts 7 and 17 draws the two sections together and locks them together, thus completing the operation of tire changing.

What I claim as my invention is:—

1. A sectional wheel divided in a plane transverse to the wheel's axis and comprising an inner and an outer section each embodying a center, a web, and an unbroken circumference, a hub, the inner one of said sections being permanently secured to the hub while the outer of said sections has a complete tire carrying rim permanently secured to it and adapted to bear detachably upon the circumference of the inner section, combined with means for detachably fastening the center of the outer section to the wheel hub and for detachably securing the two sections together near their circumference.

2. A sectional wheel for pneumatic tires comprising two sections or elements separable from one another in a plane transverse to the wheel's axis, the inner one of said sections comprising a center, a spoke or web portion and an unbroken circumference, a hub, the center being permanently attached to or incorporated with the structure of the hub, and the outer section adapted to engage the hub detachably by its center and provided on its circumference with an inflated tire carrying rim permanently secured thereto and adapted to bear removably upon the circumference of the inner section by a series of isolated wedging lugs combined with means for detachably clamping the center of the outer section to the hub and with bolts for drawing the two sections together near their circumference.

3. A vehicle wheel comprising two metal disks or stampings separable from one another in a plane transverse to the axis of the wheel and each comprising a center, web and continuous circumference, a hub, the center of the inner section being permanently fastened to the hub of the wheel while the center of the outer section is adapted to bear detachably against the hub and is provided on its circumference with a complete permanently attached inflatable tire carrying rim adapted to bear detachably upon the circumference of the inner disk or stamping.

4. A two-part or sectional disk wheel the inner element of which is secured by its center to the hub of the wheel and is provided at its circumference with a flange having isolated wedging seats or lugs while the outer element is provided at its circumference with a permanently attached tire carrying rim adapted to support and lock an inflated shoe or tire in place and adapted to engage the wedge seats with a wedging action, combined with means for detachably securing the center of the outer disk to the hub and with bolts and nuts for detachably tying or drawing the two disks together near their circumference.

5. A two-part metal vehicle wheel comprising two metal dished disks or stampings separable from one another in a plane transverse to the axis of the wheel, a hub, the inner disk being permanently fastened to the hub while the outer disk is detachably secured thereto and a complete tire carrying rim permanently carried by the outer disk and removably supported by the inner disk.

6. A sectional wheel having a hub, outer and inner sections detachably fastened together and each embodying a web or spoke portion of the wheel, said outer section having a permanently attached felly or rim upon which the tire is secured so as to be removable and detachable with said rim and said inner section being permanently attached to the hub, combined with circumferentially isolated bearing lugs by which the rim or felly and the inner section engage when the two sections of the wheel are drawn together by their fastening devices.

7. A metal vehicle wheel comprising two metal dished disks separable from one another in a plane transverse to the axis of the wheel, a hub, the inner disk being permanently fastened to the hub while the outer disk is detachably secured to the inner disk, a series of isolated lugs at the circumference of the inner disk and a complete tire carrying rim permanently secured to the outer disk and removably seated on said isolated lugs.

Signed at New York, in the county of New York and State of New York, this 6th day of July, A. D. 1916.

MAURICE LACHMAN.

Witnesses:
F. B. TOWNSEND,
IRENE LEFKOWITZ.